United States Patent
Lin (10) Patent No.: US 9,121,520 B2
(45) Date of Patent: Sep. 1, 2015

(54) GAS BREAKER

(71) Applicant: Hui-Ming Lin, Chiayi County (TW)

(72) Inventor: Hui-Ming Lin, Chiayi County (TW)

( * ) Notice: Subject to any disclaimer, the term of this patent is extended or adjusted under 35 U.S.C. 154(b) by 91 days.

(21) Appl. No.: 13/756,822

(22) Filed: Feb. 1, 2013

(65) Prior Publication Data

US 2014/0216569 A1   Aug. 7, 2014

(51) Int. Cl.
*F16K 17/36* (2006.01)

(52) U.S. Cl.
CPC ............... *F16K 17/36* (2013.01); *F16K 17/363* (2013.01); *Y10T 137/0753* (2013.01)

(58) Field of Classification Search
USPC ........ 251/66, 72; 137/39, 45, 315.16, 315.37, 137/38
See application file for complete search history.

(56) References Cited

U.S. PATENT DOCUMENTS

| 891,342 | A | * | 6/1908 | Junggren | 137/49 |
| 2,158,753 | A | * | 5/1939 | Hansen | 137/45 |
| 2,570,593 | A | * | 10/1951 | Ray | 74/104 |
| 3,195,433 | A | * | 7/1965 | Fernald | 396/468 |
| 3,890,993 | A | * | 6/1975 | MacNeilage | 137/45 |
| 3,965,917 | A | * | 6/1976 | Speck | 137/38 |
| 4,546,660 | A | * | 10/1985 | Bujold | 74/2 |
| 5,209,454 | A | * | 5/1993 | Engdahl et al. | 251/65 |
| 6,112,764 | A | * | 9/2000 | Engdahl et al. | 137/554 |

\* cited by examiner

*Primary Examiner* — Marina Tietjen
*Assistant Examiner* — Umashankar Venkatesan
(74) *Attorney, Agent, or Firm* — Rosenberg, Klein & Lee (57) ABSTRACT

A gas breaker includes a case with a chamber defined therein. The case includes an inlet path and an outlet path which is located corresponding to the inlet path. A board is pivotably located in the chamber and has a sealing member on the first end thereof for sealing the outlet path, and an extension extending from the second end of the board. The extension is engaged with a hook on a hook plate pivotably located in the chamber. When earthquake happens, the hook plate swings due to the earthquake so as to separate the hook and the extension. The sealing member on the first end of the board seals the outlet path to cut off the gas so that the gas cannot enter the gas line of the house.

13 Claims, 9 Drawing Sheets

GAS BREAKER

BACKGROUND OF THE INVENTION

1. Fields of the Invention

The present invention relates to a beaker, and more particularly, to a gas breaker to automatically break the gas when earthquake happens.

2. Descriptions of Related Art

The main cause of earthquakes is when there is a sudden movement of various plate boundaries or when plates scrape against each other, the energy generated between the shifting of the plates cannot be absorbed by the plates. In the Pacific area, the movement between the Eurasian plate and the Philippine plate causes frequent earthquakes which damage the houses and roads, and causes gas leak. The gas is flammable and the gas leak may cause fire to further damage buildings and houses. The damage to the people from the fire sometimes is larger than the earthquakes themselves. How to automatically cut the circuit of gas during earthquakes is one of the main concerns for everyone.

The present invention intends to provide a gas breaker which automatically cut the circuit of gas during earthquakes.

SUMMARY OF THE INVENTION

The present invention relates to a gas breaker and comprises a case with a chamber defined therein. The case includes an inlet path and an outlet path which is located corresponding to the inlet path. A board is pivotably located in the chamber and has a sealing member on the first end thereof for sealing the outlet path, and an extension extending from the second end of the board. A hook plate is pivotally located in the chamber and a hook is formed at the first end of the hook plate. The hook is engaged with the extension of the board. A weight is connected to the second end of the hook plate.

When earthquake happens, the hook plate swings due to the earthquake so as to separate the hook and the extension. The sealing member on the first end of the board seals the outlet path to cut off the gas so that the gas cannot enter the gas line of the house.

The primary object of the present invention is to provide a gas breaker which is simple and effective for preventing gas from entering the house during earthquakes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 4, the gas breaker of the present invention comprises a case 1, a board 2, a hook plate 3, a reset button 4 and a break button 5.

The case 1 is composed of a top part 11 and a bottom part 12. A chamber 15 is defined in the case 1. The top part 11 has an inlet path 13 defined therethrough and the bottom part 12 has an outlet path 14 defined therethrough which is located corresponding to the inlet path 13. The inlet and outlet paths 13, 14 communicate with the chamber 15. A magnetic member 16 is located beside the outlet path 14. A shaft 17 is pivotably located in the chamber 15.

Figure 3:
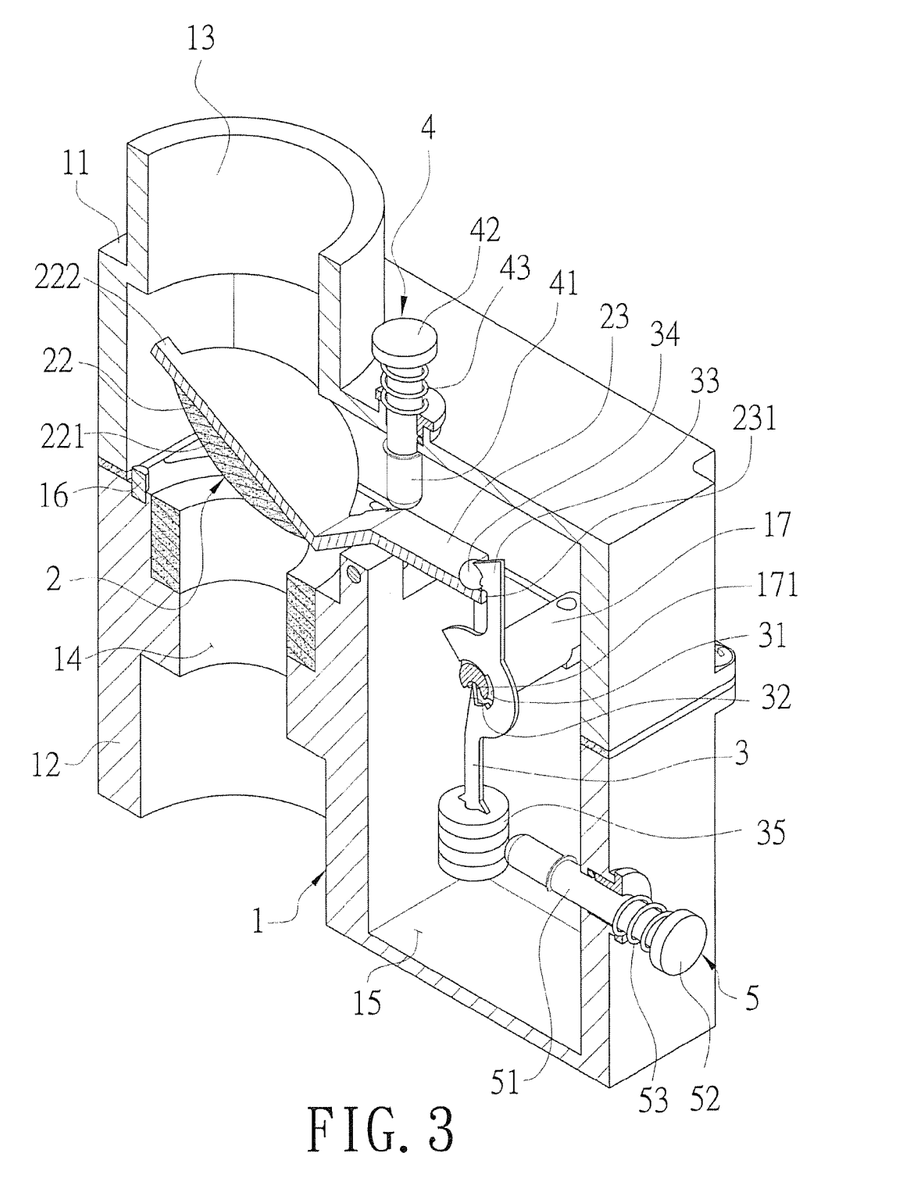
FIG. 3 is a cross sectional view of the gas breaker of the present invention.
Figure 4:
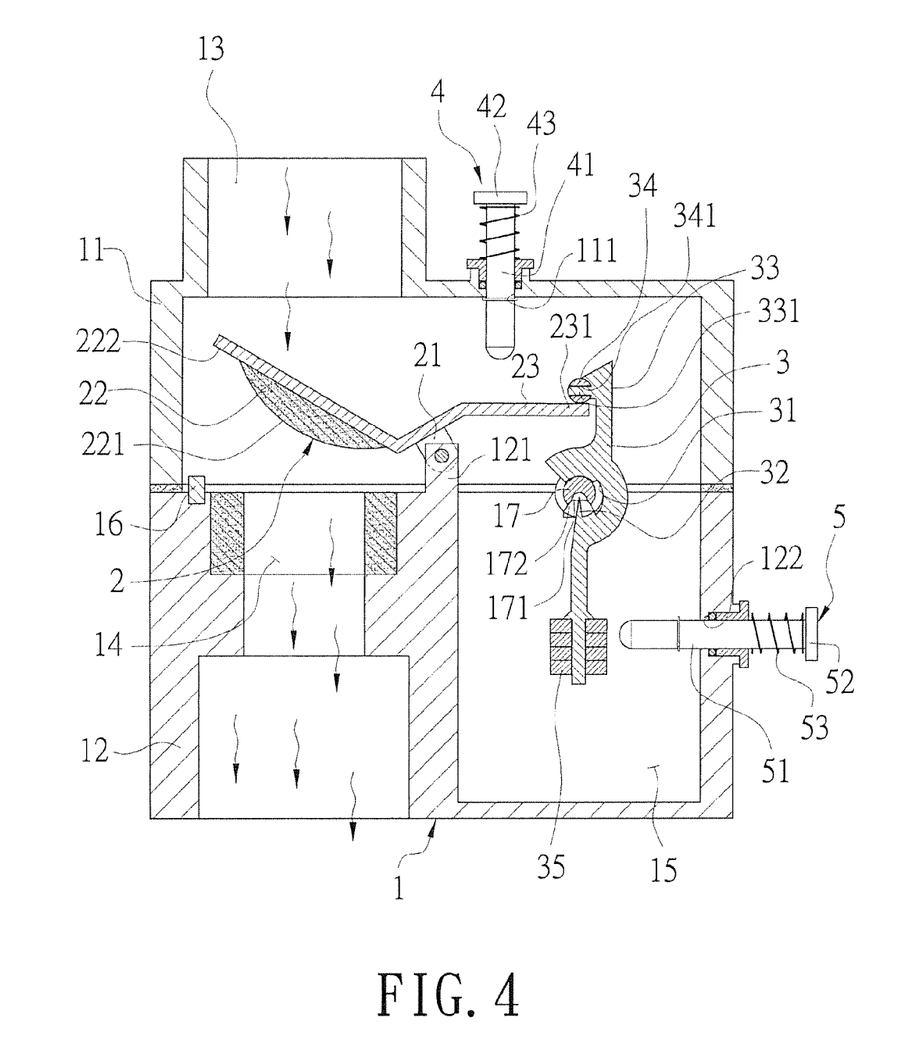
FIG. 4 is a cross sectional plan view of the gas breaker of the present invention.
Figure 5:
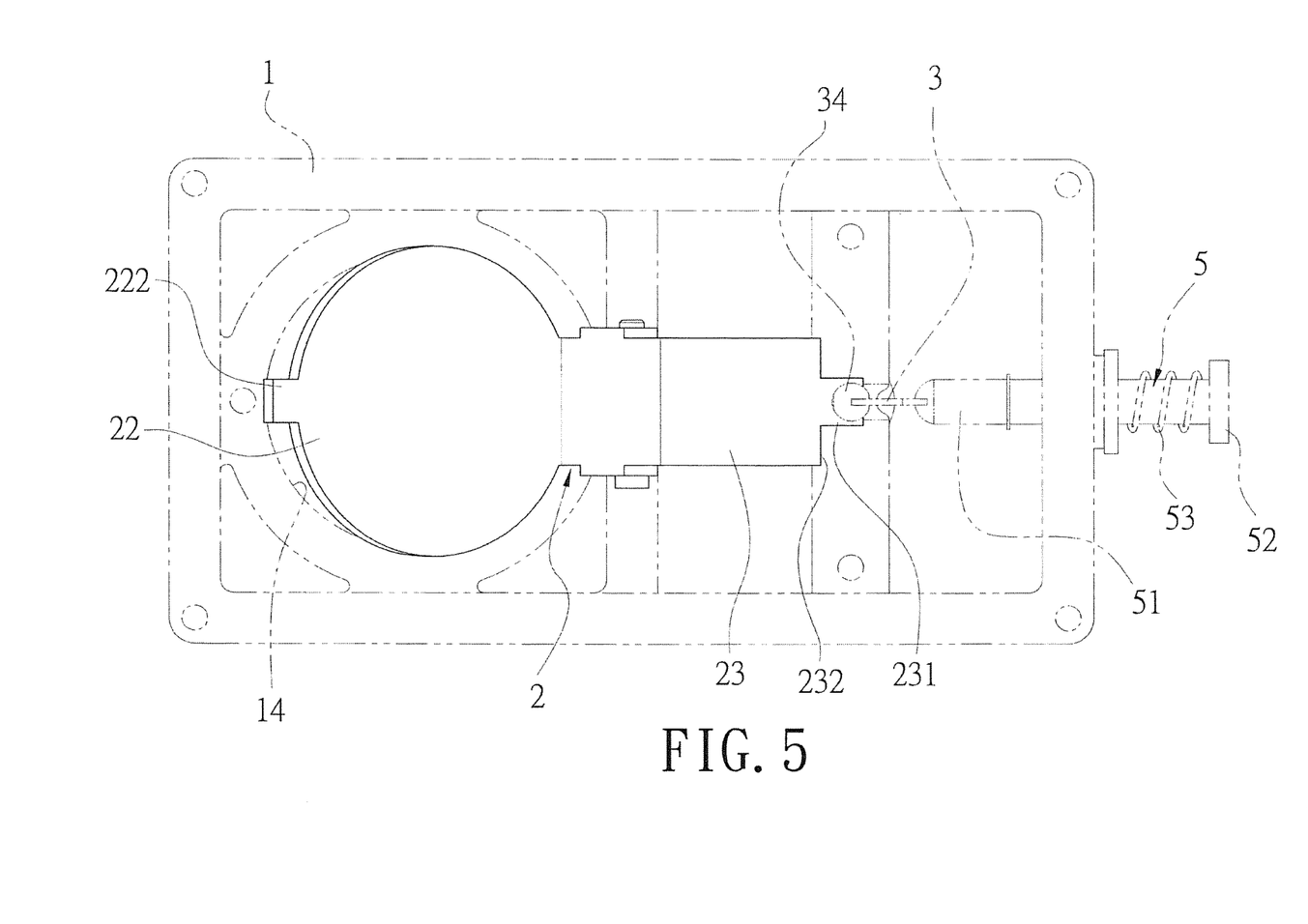
FIG. 5 shows the top view of the board of the gas breaker of the present invention.

The board 2 is pivotably located in the chamber 15 and a pivotal portion 21 is formed at an intermediate portion of the board 2. The pivotal portion 21 of the board 2 is pivotably connected with another pivotal portion 121 in the chamber 15 of the bottom part 12 by a pin. A sealing member 22 is connected to the first end of the board 2 and located above the outlet path 14. The sealing member 22 has a soft pad which has a curved and convex face 221 so as to seal the outlet path 14. A magnetic protrusion 222 is located beside the sealing member 22, the magnetic member 16 is magnetically attracted by the magnetic protrusion 222. An extension 23 extends from the second end of the board 2 and a protrusion 231 extends from the extension 23. Two notches 232 are defined in two sides of the protrusion 231 as shown in FIG. 5.

Figure 1:
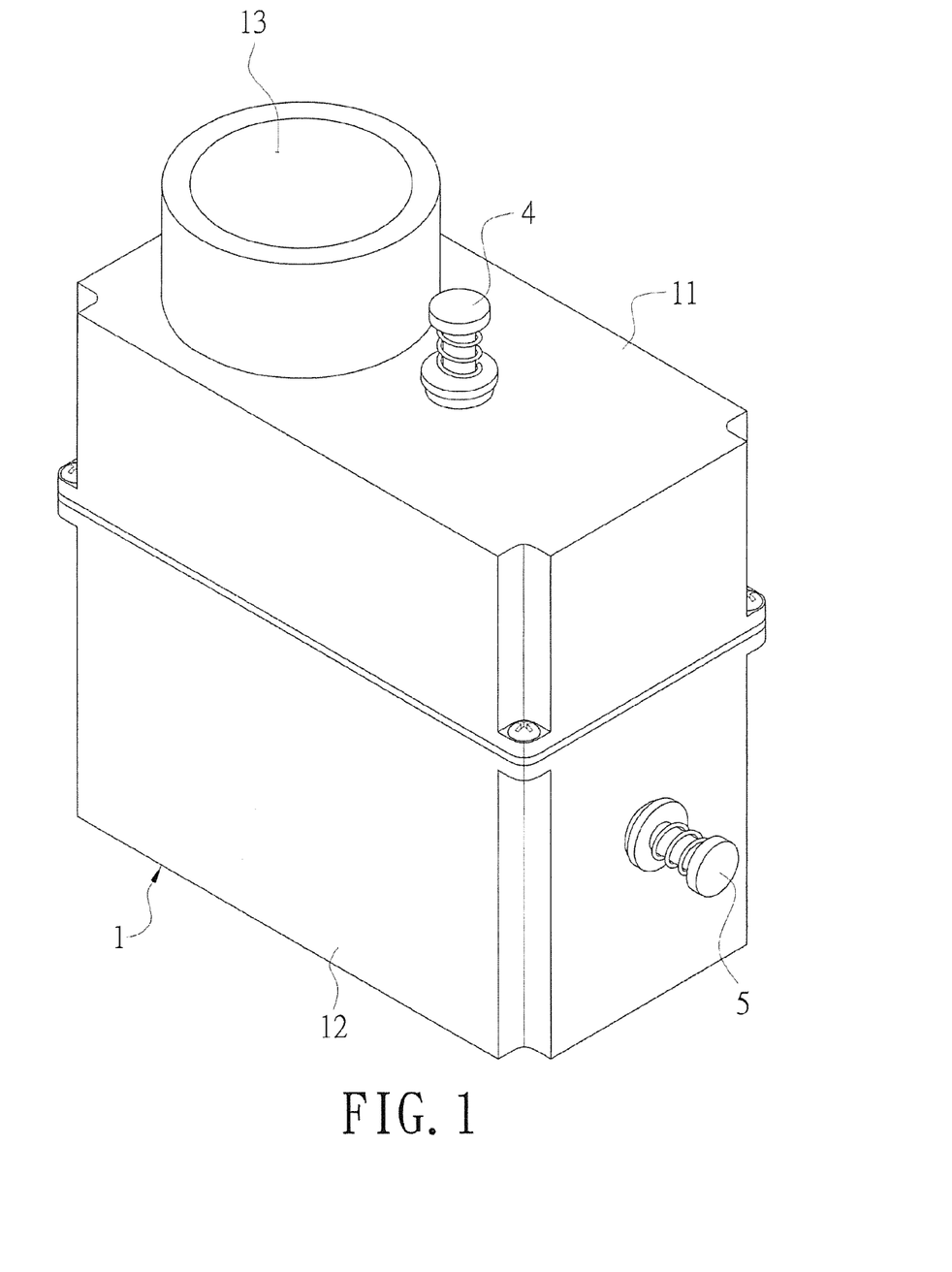
FIG. 1 is a perspective view to show the gas breaker of the present invention.
Figure 2:
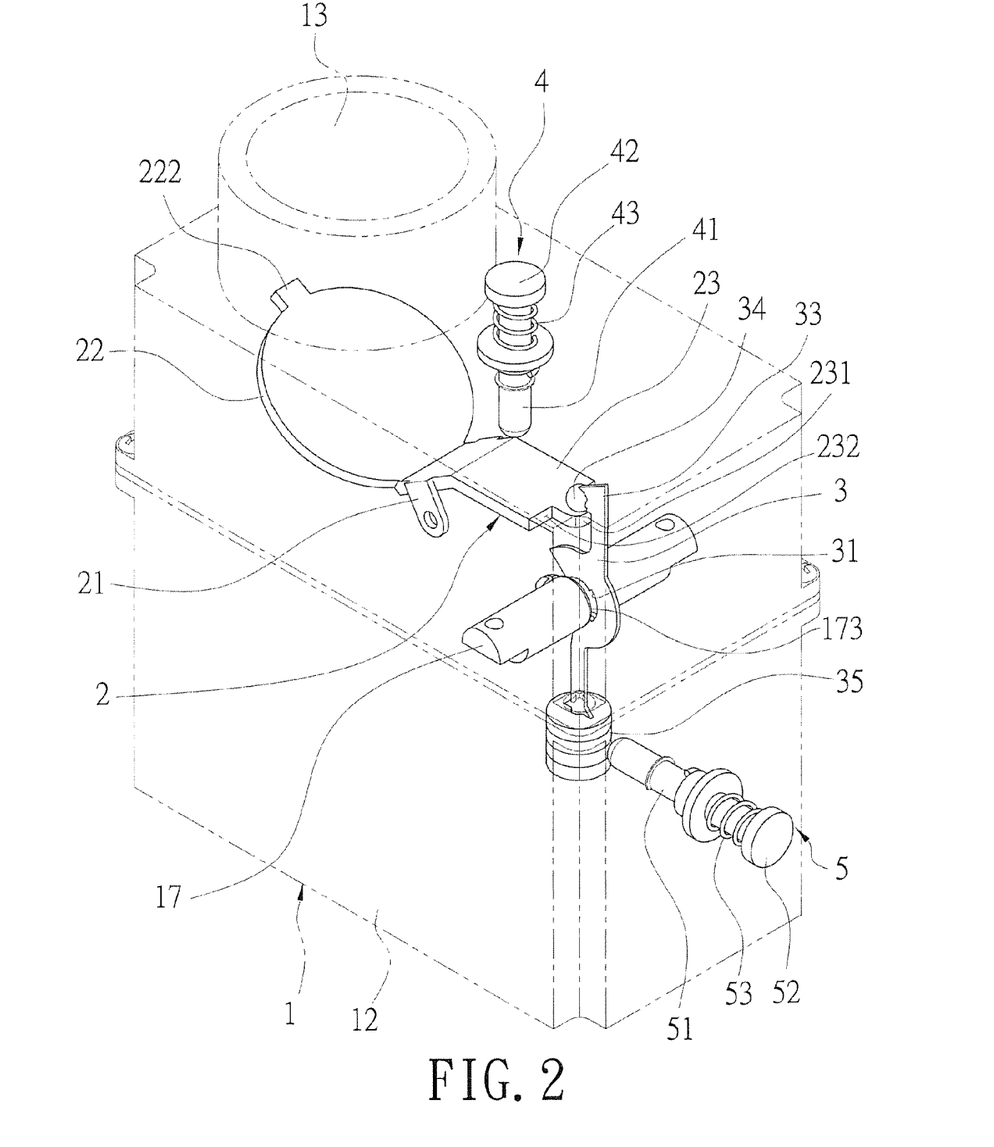
FIG. 2 is a perspective view to show the parts in the case of the gas breaker of the present invention.

The hook plate 3 is pivotably located in the chamber 15 and has a recess 31 with which the shaft 17 is engaged. A probe 32 extends from the inside of the recess 31 of the hook plate 3. The diameter of the slot 171 of the shaft 17 is larger than the diameter of the probe 32 of the hook plate 3. Two guide faces 172 are defined in the inside of the slot 171 so that the probe 32 of the hook plate 3 can be guided to be engaged with the slot 171 via the guide faces 172. The shaft 17 has a groove 173 defined in the outside thereof and the groove 173 is located corresponding to the slot 171, so that the hook plate 3 is engaged with the groove 173. A hook 33 is formed at the first end of the hook plate 3 and an insertion 331 extends from the hook 33. The hook 33 is connected with a bead 34 which has an aperture 341 through which the insertion 331 is inserted. The bead 34 contacts the protrusion 231 of the board 2. Multiple weights 35 are connected to the second end of the hook plate 3.

The reset button 4 is installed to top of the top part 11 and has a first push portion 42 on outside of the case 1. A first rod 41 is connected to the first push portion 42. The case 1 has a first through hole 111 communicating with the chamber 15. The first rod 41 movably extends through the first through hole 111 and contacts the extension 23 of the board 2. A first resilient member 43 is mounted to the first rod 41 and biased between the case 1 and the first push portion 42 of the reset button 4. The break button 5 is installed to one side of the bottom part 12 and has a second push portion 52 on outside of the case 1. A second rod 51 is connected to the second push portion 52. The bottom part 12 of the case 1 has a second through hole 122 communicating with the chamber 15. The second rod 51 movably extends through the second through hole 122 and contacts a lower end of the hook plate 3. A second resilient member 53 is mounted to the second rod 51 and biased between the case 1 and the second push portion 52 of the break button 5.

As shown in FIG. 3, the gas breaker is connected between the gas line of the house and the gas provider company. The inlet path 13 of the top part 11 of the case 1 connected with the gas line of the gas provider company, and the outlet path 14 of the bottom part 12 is connected with the gas line of the house.

When in use, as shown in FIG. 4, the bead 34 at the hook 33 of the hook plate 3 is hooked to the protrusion 231 of the extension 23 of the board 2 as shown in FIG. 5. The weights 35 pull one end of the extension 23 downward and the board 2 is pivoted about the two respective pivotal portions 21, 121 so that the sealing member 22 is lifted so that outlet pat 14 is opened. The gas provided by the gas provider company enters from the inlet path 13 and is introduced into the gas line of the house via the outlet pat 14.

Figure 6:
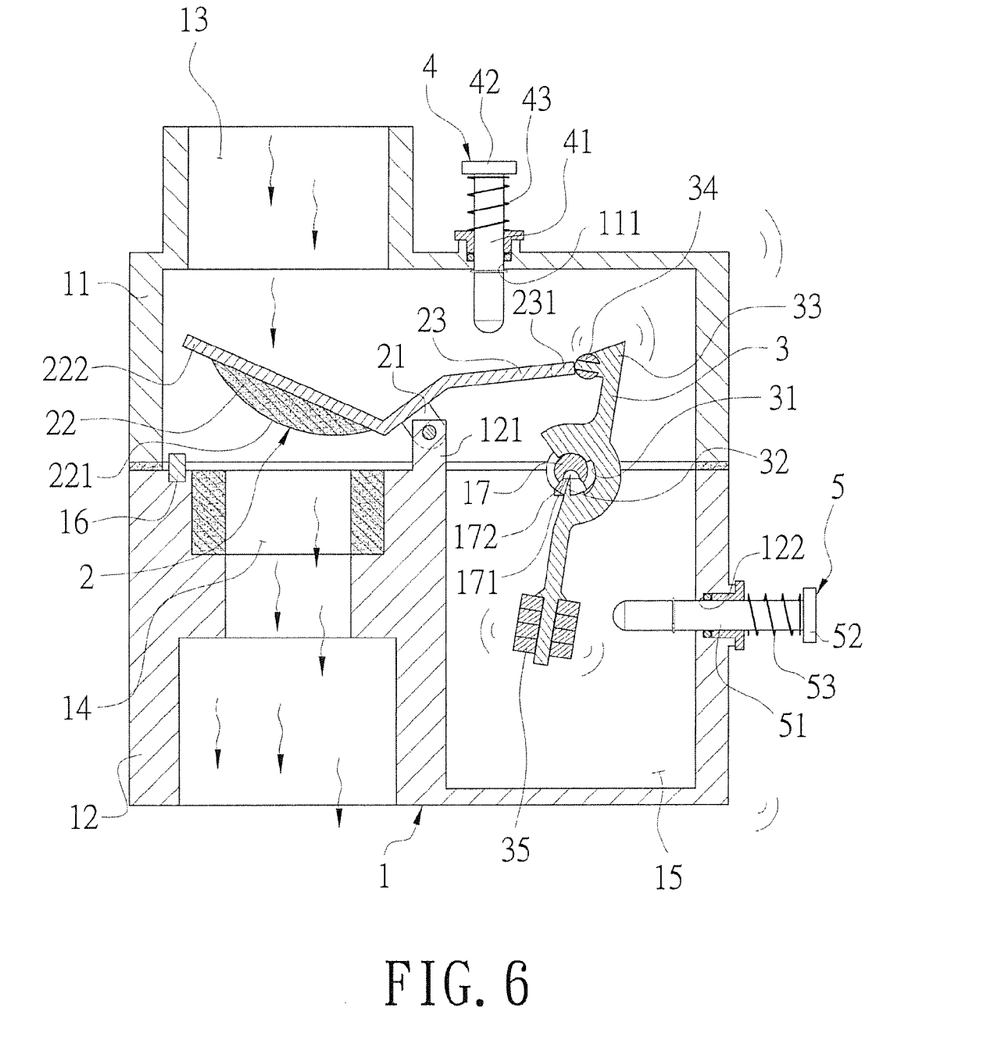
FIG. 6 is a cross sectional view to show that the hook plate swings during an earthquake.
Figure 7:
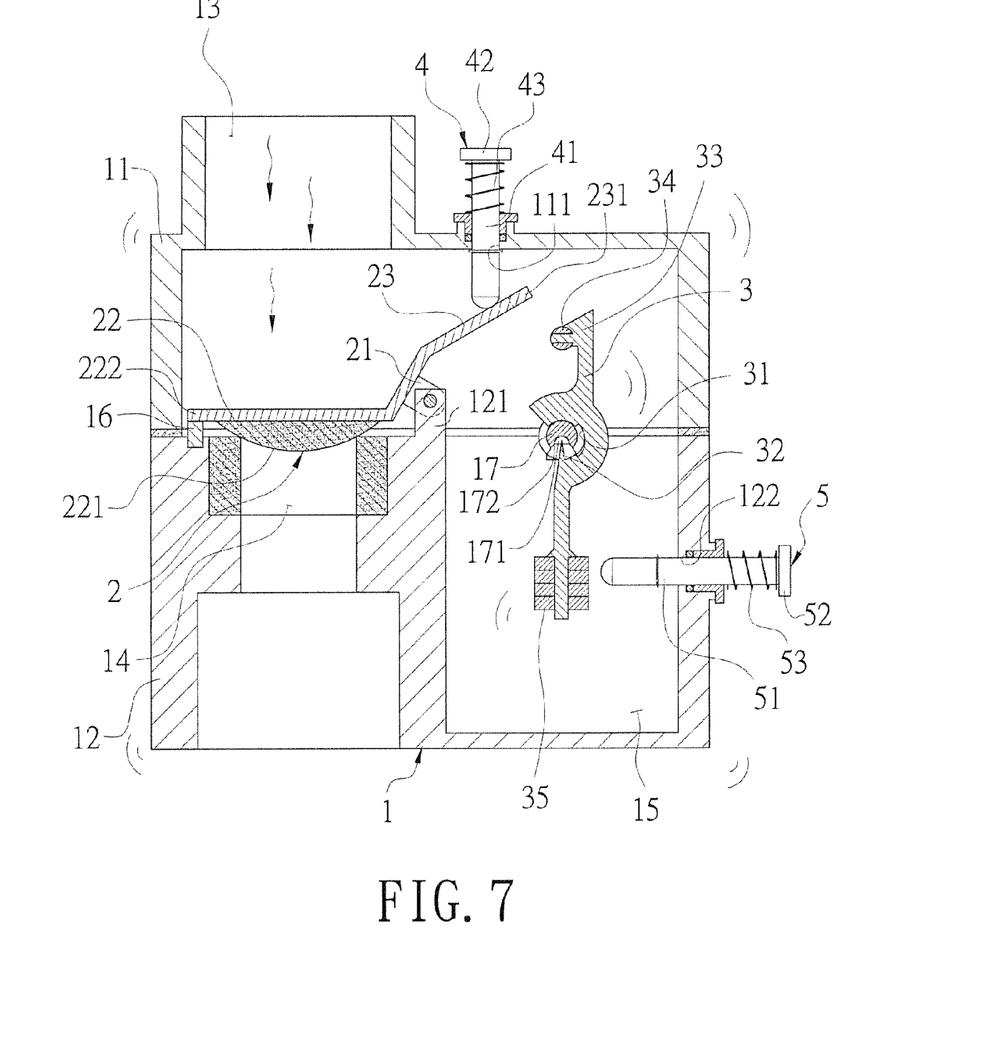
FIG. 7 is a cross sectional view to show that the hook plate swings and the sealing member seals the outlet path of the gas breaker of the present invention.

As shown in FIG. 6, when an earthquake happens, the earthquake generates horizontal and vertical vibrations, the hook plate 3 that is engaged with the shaft 17 of the case 1 is affected by the vibrations so that the hook plate 3 swings relative to the shaft 17. The because the diameter of the slot 171 is larger than that of the probe 32, so that the probe 32 is allowed to move back and forth, left and right, and even rotate 360 degrees. In other words, the hook plate 3 can swing back and forth, and left and right along with the vibrations. The head 34 at the hook 33 that is hooked to the protrusion 231 slides away from the protrusion 231 so that the board 2 is not engaged with the protrusion 231. Along with the separation of the hook 33 from the protrusion 231, the sealing member 22 is lowered due to gravity, and the magnetic member 16 beside the outlet path 14 is attracted by the magnetic protrusion 222 beside the sealing member 22, so that the sealing member 22 seals the outlet path 14 as shown in FIG. 7 to stop the gas from entering the gas line of the house. By this way, the gas leak is prevented and the property and lives are protected.

Figure 8:
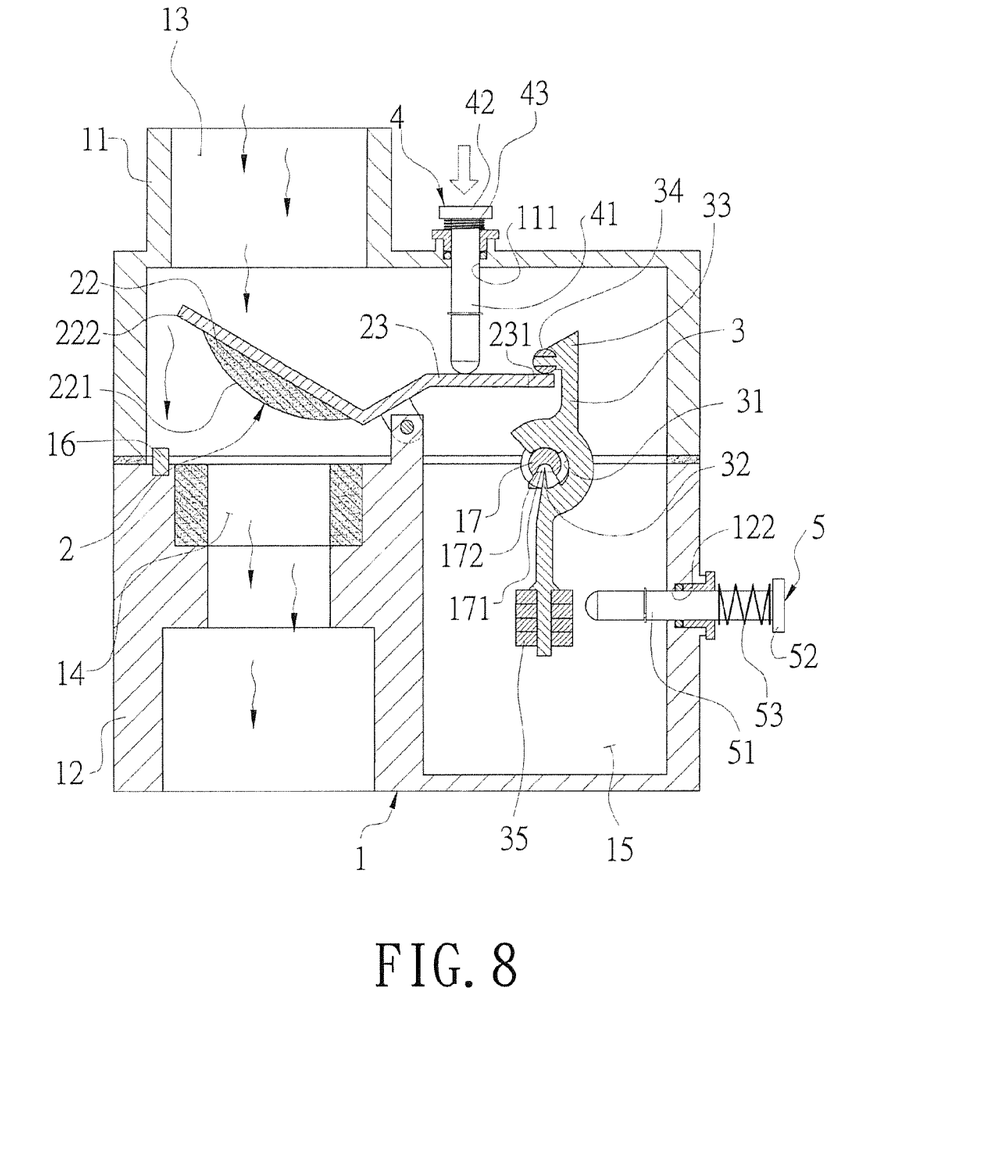
FIG. 8 shows that the user pushes the reset button to reset the gas breaker of the present invention.

After the earthquake, as shown in FIG. 8, the user pushes the first push portion 42 of the reset button 4, the first rod 41 is pushed in the chamber 15 and moves the extension 23 of the board 2. The extension 23 is lowered so that the sealing member 22 is lifted to open the outlet path 14. The gas provided by the gas provider company flows through the inlet path 13 and the outlet path 14, and is introduced into the gas line of the house. When the extension 23 of the board 2 is pushed and lowered by the reset button 4, the protrusion 231 is lowered to the hook 33 of the hook plate 3. Thanks the design of the groove 173 of the shaft 17, the range of the swing of the hook plate 3 is limited, and the when the board 2 is hooked with the hook plate 3 again, the protrusion 231 of the board 2 can be precisely hooked with the hook 33 of the hook plate 3. When the reset button 4 is released, the first resilient member 43 pushes the first push portion 42 of the reset button 4, so that the sealing member 22 of the board 2 is maintained not to seal the outlet path 14 and the gas is provided to the house as expected.

Figure 9:
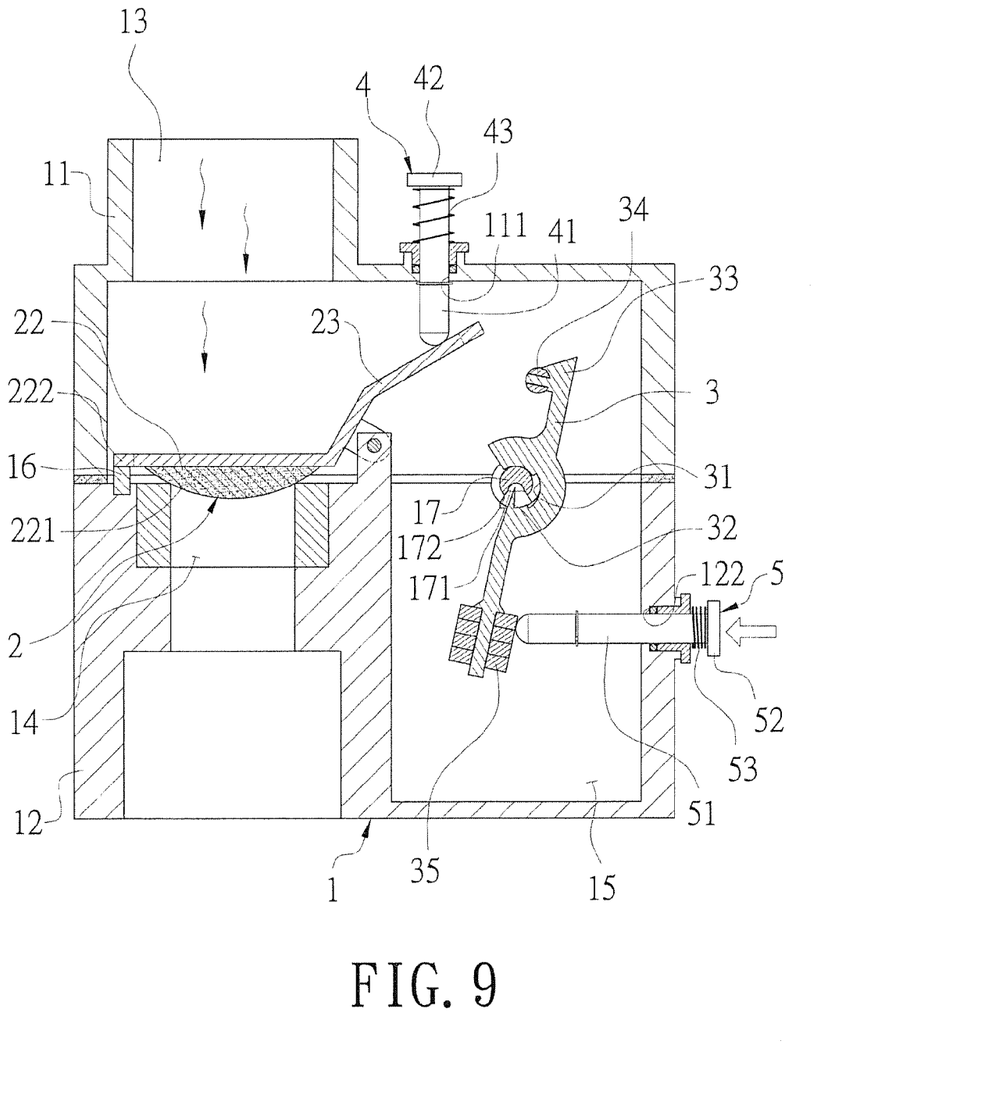
FIG. 9 shows that the user pushes the break button to activate the gas breaker of the present invention.

When the user is going to leave from the house for a period of time, in order to ensure that the gas leak can be avoided, the user manually pushes the second push portion 52 of the break button 5 as show in FIG. 9.

The second rod 51 is pushed in the chamber 15 and pivots the lower end of the hook plate 3 an angle. The hook plate 3 is pivoted about the shaft 17, and the hook 33 and the bead 34 are moved away from the extension 23 so that the protrusion 231 on the extension 23 of the board 2 is separated from the hook 33. The sealing member 22 is lowered by gravity, and the magnetic member 16 beside the outlet path 14 is attracted by the magnetic protrusion 222 beside the sealing member 22, such that the sealing member 22 seals the outlet path 14 to stop the gas from entering the gas line of the house. By this way, the gas leak is prevented and the property is protected when the user is not at home.

While we have shown and described the embodiment in accordance with the present invention, it should be clear to those skilled in the art that further embodiments may be made without departing from the scope of the present invention.

What is claimed is:

1. A gas breaker comprising:
   a case having a chamber defined therein, the case having an inlet path and an outlet path corresponding to the inlet path;
   a board pivotably located in the chamber and a sealing member connected to a first end of the board to seal the outlet path, and an extension extending from a second end of the board;
   a shaft disposed in the chamber; and
   a hook plate pivotably coupled to an intermediate portion of the shaft, the hook plate being biased for self-positioning to an engaged position, and a hook being formed at a first end of the hook plate, the hook in the engaged position engaging the extension of the board, a weight connected to a second end of the hook plate.

2. The gas breaker as claimed in claim 1, wherein the extension of the board has a protrusion extending therefrom which contacts the hook of the hook plate, two notches are defined in two sides of the protrusion.

3. The gas breaker as claimed in claim 2, wherein the hook is connected with a bead which contacts the protrusion of the board.

4. The gas breaker as claimed in claim 1, wherein the intermediate portion of the shaft has a groove pivotally engaging a recess of the hook plate, a probe projects from an inside of the recess of the hook plate and disposed in a slot of the shaft.

5. The gas breaker as claimed in claim 4, wherein a diameter of the slot of the shaft is larger than a diameter of the probe of the hook plate.

6. The gas breaker as claimed in claim 4, wherein the shaft has the groove defined in an outside thereof and the groove is located corresponding to the slot, the hook plate is engaged with the groove.

7. The gas breaker as claimed in claim 4, wherein the shaft has two guide faces defined in an inside thereof.

8. The gas breaker as claimed in claim 1, wherein the case has a magnetic member located beside the outlet path and a magnetic protrusion is located beside the sealing member, the magnetic member is magnetically attracted by the magnetic protrusion.

9. The gas breaker as claimed in claim 1, wherein the sealing member has a pad which has a curved and convex face so as to seal the outlet path.

10. The gas breaker as claimed in claim 1, wherein the case has one of a reset button and a break button connected thereto, the reset button has a first push portion on outside of the case, a first rod is connected to the first push portion, the case has a first through hole communicating with the chamber, the first rod movably extends through the first through hole and contacts the extension of the board, a first resilient member is mounted to the first rod and biased between the case and the first push portion of the reset button, the break button has a second push portion on outside of the case, a second rod is connected to the second push portion, the case has a second through hole communicating with the chamber, the second rod movably extends through the second through hole and contacts a lower end of the hook plate, a second resilient member is mounted to the second rod and biased between the case and the second push portion of the break button.

11. The gas breaker as claimed in claim 1, further comprising a reset button passing displaceably through the case for re-positioning the board to re-engage the hook plate following disengagement therefrom.

12. The gas breaker as claimed in claim 1, further comprising a break button passing displaceably through the case for re-positioning the hook plate away from the engaged position.

13. The gas breaker as claimed in claim 12, further comprising a reset button passing displaceably through the case for re-positioning the board to re-engage the hook plate following disengagement therefrom.

* * * * *